US012310920B1

(12) United States Patent
Ou

(10) Patent No.: US 12,310,920 B1
(45) Date of Patent: May 27, 2025

(54) MASSAGER

(71) Applicant: Reestar International Limited, Hong Kong (CN)

(72) Inventor: Yangting Ou, Hong Kong (CN)

(73) Assignee: Reestar International Limited, Hong Kong (CN)

( * ) Notice: Subject to any disclaimer, the term of this patent is extended or adjusted under 35 U.S.C. 154(b) by 0 days.

(21) Appl. No.: 19/021,269

(22) Filed: Jan. 15, 2025

(51) Int. Cl.
*A61H 9/00* (2006.01)

(52) U.S. Cl.
CPC ... *A61H 9/0092* (2013.01); *A61H 2201/0192* (2013.01); *A61H 2201/1246* (2013.01); *A61H 2201/1604* (2013.01); *A61H 2201/165* (2013.01)

(58) Field of Classification Search
CPC .... A61H 2201/1246; A61H 2201/0103; A61H 2201/0157; A61H 2201/0161; A61H 2201/165; A61H 2201/1602; A61H 2201/1604; A61H 9/00; A61H 1/0296; A61H 9/005–0092; A61H 2201/0192; A61H 2205/02–022; A61H 2205/024–025; A61H 2205/028; A61H 2205/06; A61H 2205/10; A61H 2205/106–108; A61M 16/08–0891; A61M 16/0683
See application file for complete search history.

(56) References Cited

U.S. PATENT DOCUMENTS 3,525,333 A * 8/1970 Mencacci ............ A61H 9/0078
601/149

FOREIGN PATENT DOCUMENTS

CN 212547392 * 2/2021
CN 214343349 * 10/2021

* cited by examiner

*Primary Examiner* — Kendra D Carter
*Assistant Examiner* — Jaeick Jang

(57) ABSTRACT

A massager includes: a massager body; a first massaging member; at least one pump; at least one bladder; and at least one extending pipeline. A distance between the first massaging member and the massager body is adjustable. The pump is arranged on the massager body. The is arranged on the first massaging member and communicated with the at least one pump. The extending pipeline communicates one pump with one bladder, or communicates any two bladders with each other. Each extending pipeline includes two connection portions and an extending portion connecting the two connection portions with each other; each connection portion is connected to a respective one pump or a respective one bladder, and the extending portion is extendable in length.

17 Claims, 9 Drawing Sheets

MASSAGER

TECHNICAL FIELD

Embodiments of the present disclosure relate to the technical field of massaging devices, and more specifically, to a massager.

BACKGROUND

A massager in the art is usually arranged with a fluid massaging structure, and the fluid massaging structure has a pump and a bladder. The pump and the bladder are connected to each other via a pipeline. The pump is configured to input a gas or a liquid into the bladder, such that the bladder expands or retracts. Expanding and retraction of the bladder achieves a massaging function. In order to achieve an optimal massaging effect, the massager is arranged with a wearable structure to attach the massager to a to-be-massaged part of a body.

However, due to variability among users, a body part of one user may be in a different size from a body part of another user. Even if a wearing size of the massager is pre-defined based on market research data, the pre-defined size is suitable for a limited range, and it is difficult to meet demands of various users. The wearing size of the massager in the art is usually limited to a maximum length of the pipeline arranged therein. When a larger wearing size is needed, a longer pipeline is needed, leading to an increase in an overall size of the massager or difficulties in arranging the pipeline inside the massager.

SUMMARY

The present disclosure provides a massager, including: a massager body; a first massaging member; at least one pump; at least one bladder; and at least one extending pipeline. A distance between the first massaging member and the massager body is adjustable. The at least one pump is arranged on the massager body. The at least one bladder is arranged on the first massaging member and communicated with the at least one pump. The at least one extending pipeline communicates one of the at least one pump with one of the at least one bladder, or communicates any two of the at least one bladder with each other. Each of the at least one extending pipeline includes two connection portions and an extending portion connecting the two connection portions with each other; each of the two connection portions is connected to a respective one the at least one pump or a respective one the at least one bladder, and the extending portion is extendable in length.

BRIEF DESCRIPTION OF THE DRAWINGS

In order to more clearly illustrate technical solutions in embodiments of the present disclosure, accompanying drawings used in the embodiments will be briefly introduced below. Obviously, the accompanying drawings in the following description show only some of the embodiments of the present disclosure, and any ordinary skilled person in the art may obtain other accompanying drawings based on these drawings without creative work.

REFERENCE NUMERALS IN THE DRAWINGS

Figure 1:
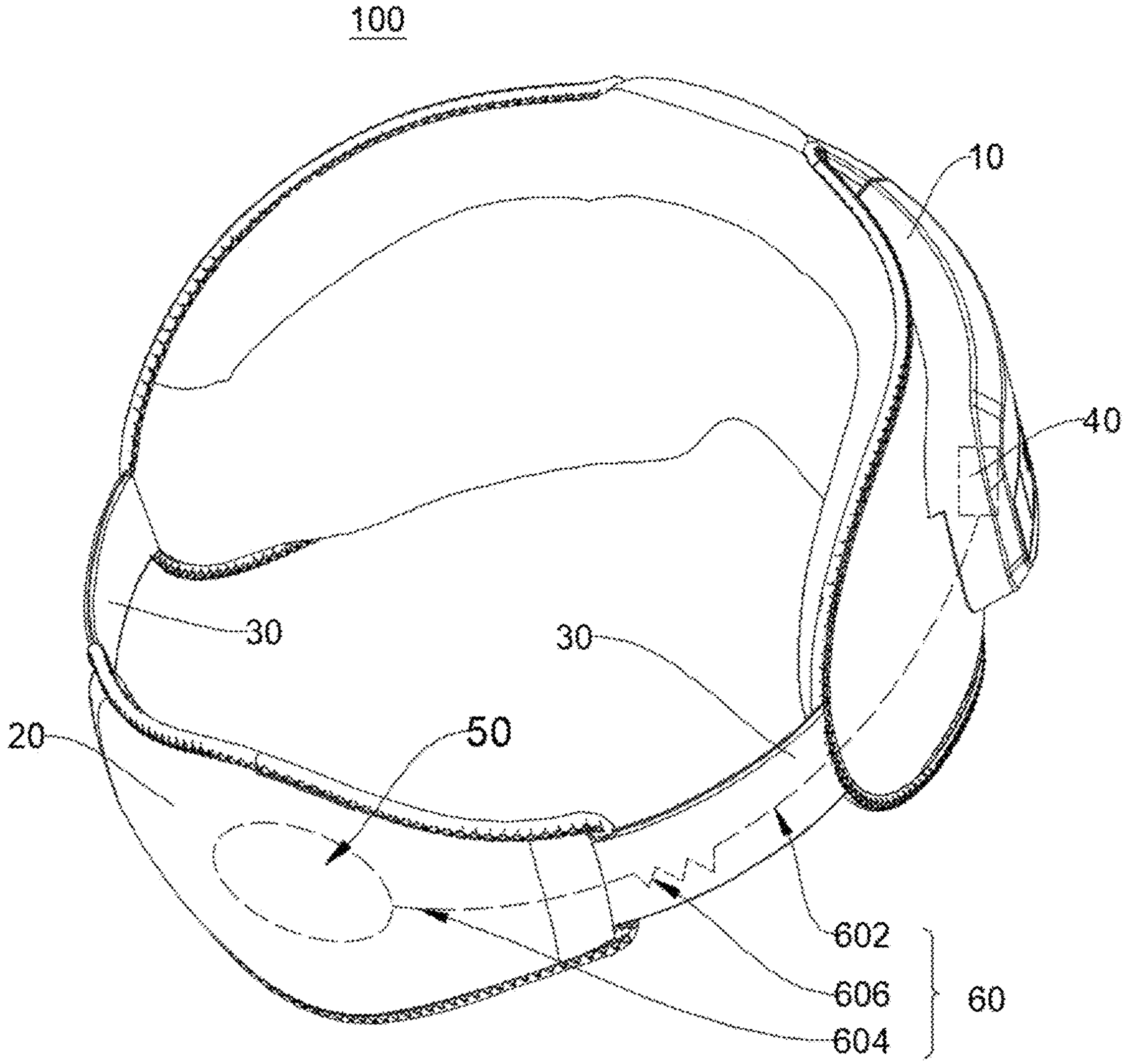
FIG. 1 is a structural schematic view of an entirety of a massager according to an embodiment of the present disclosure.

100—massager; 10—massager body; 102—second massaging member; 104—second bladder; 20—first massaging member; 202—fabric layer; 204—receiving space; 22—first connection end; 24—second connection end; 30—adjustment belt; 32—first belt body; 34—second belt body; 36—adjustment clasp; 40—pump; 50—bladder; 502—opening end; 60—extending pipeline; 600—connection portion; 606—extending portion; 70—elastic member; 702—connection cavity.

DETAILED DESCRIPTIONS

Unless otherwise defined, all technical and scientific terms used herein have the same meaning as commonly understood by any ordinary skilled person in the. The terms used herein in the specification of the present disclosure are used only for the purpose of describing specific embodiments and are not intended to limit the present disclosure. Terms "include", "have", and any variations thereof in the specification, claims and the accompanying drawings of the present disclosure are intended to cover non-exclusive inclusion. Terms "first", "second", and so on in the specification, claims, and the drawings of the present disclosure are used to distinguish between different objects and are not intended to describe a particular order.

Reference to "embodiments" herein implies that particular features, structures or characteristics described in an embodiment may be included in at least one embodiment of the present disclosure. Presence of the phrase at various sections in the specification does not necessarily refer to one same embodiment nor a separate or alternative embodiment that is mutually exclusive of other embodiments. Any ordinary skilled person in the art shall understand, both explicitly and implicitly, that the embodiments described herein may be combined with other embodiments.

In order to enable any ordinary skilled person in the art to better understand the embodiments of the present disclosure, technical solutions in the embodiments of the present disclosure will be clearly and completely described below by referring to the accompanying drawings.

As shown in FIGS. 1 to 9, the present disclosure provides a massager 100. The massager 100 includes a massager body 10, a first massaging member 20, an adjustment belt 30, at least one pump 40, at least one bladder 50, and at least one extending pipeline 60.

Specifically, as shown in FIG. 1, the first massaging member 20 is connected to the massager body 10 via the adjustment belt 30. A length of the adjustment belt 30 is adjustable, such that a distance between the first massaging member 20 and the massager body 10 can be changed. In other words, a size of a wearing space enclosed by the massager body 10, the first massaging member 20 and the adjustment belt 30 can be changed by adjusting the length of the adjustment belt 30. In this way, the massager 100 can be adapted to various sizes of to-be-massaged body parts. For example, when the massager is a head massager, changing the length of the adjustment belt 30 allows the massager to fit heads of various sizes.

The at least one pump 40 is mounted on the massager body 10, the at least one bladder 50 is mounted on the first massaging member 20. The at least one bladder 50 is connected to the at least one pump 40. The at least one extending pipeline 60 is arranged to fluidly communicate one of the at least one pump 40 with a one respective one of the at least one bladder 50 or to fluidly communicate two of the at least one bladder 50 with each other.

As shown in FIGS. 2-7, each of the at least one extending pipeline 60 includes two connection portions 600 and an extending portion 606 connected to the two connection portions 600. Each of the two connection portions 600 is connected to a respective one the at least one pump 40 or a respective one the at least one bladder 50, and the extending portion 606 is extendable in length.

For example, in an embodiment, as shown in FIG. 1, the number of the at least one pump 40 is one, and the number of the at least one bladder 50 is one. Correspondingly, the number of the at least one extending pipeline 60 is one. One of the two connection portions 600 of the extending pipeline 60 is connected to the pump 40, and the other one of the two connection portions 600 is connected to the bladder 50. The extending portion 606 is disposed between the pump 40 and the bladder 50.

Figure 5:
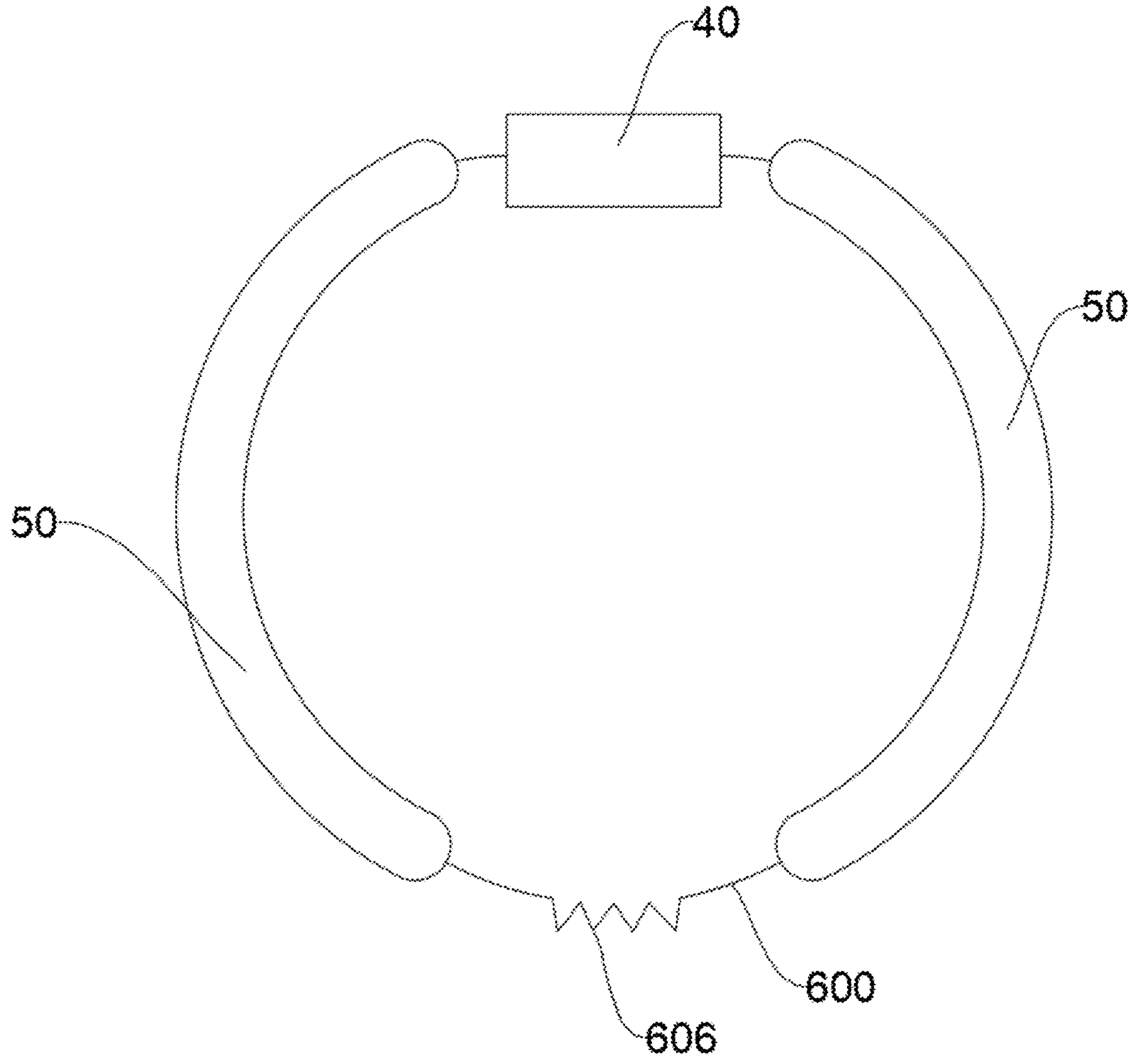
FIG. 5 is a structural schematic view showing arrangement of a pump, a bladder, and a flexible pipeline according to another embodiment of the present disclosure.

In another example, as shown in FIG. 5, the number of the at least one pump 40 is one, the number of the at least one bladder 50 is two, the number of the at least one extending pipeline 60 is one. The pump is directly connected to one of the two bladders 50, and the two connection portions 600 of the extending pipeline 60 are respectively connected to the two bladders 50. The extending portion 606 is disposed between the two bladders 50.

Figure 6:
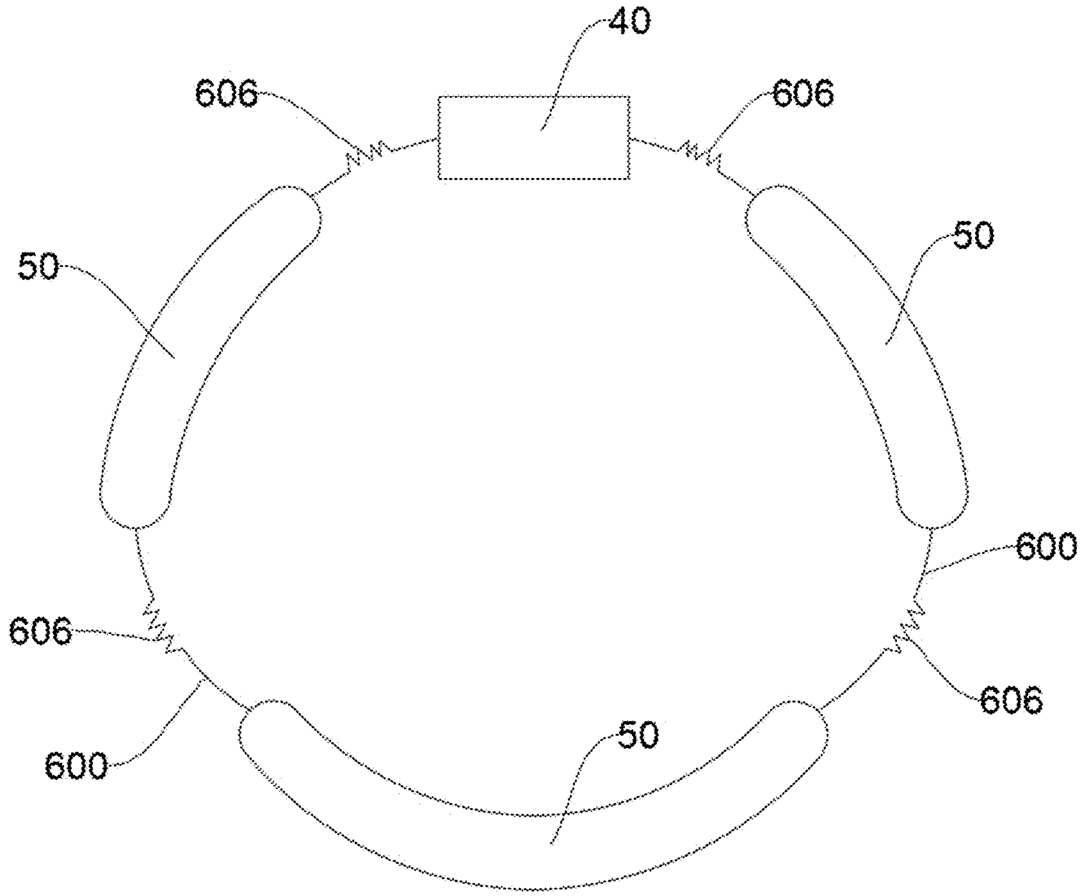
FIG. 6 is a structural schematic view showing arrangement of the pump, the bladder, and the flexible pipeline according to another embodiment of the present disclosure.

In another example, as shown in FIG. 6, the number of the at least one pump 40 is one, the number of the at least one bladder 50 is three, and the number of the at least one extending pipeline 60 is four. One of the four extending pipelines 60 communicates a first one of the at least one bladder 50 with a second one of the at least one bladder 50; and another one of the four extending pipelines 60 communicates the second one of the at least one bladder 50 with a third one of the at least one bladder 50. The rest two of the four extending pipelines 60 communicate the pump 40 respectively to the first one of the at least one bladder 50 and to the second one of the at least one bladder 50.

In some embodiments, the at least one pump 10 is arranged inside the massager body 10, and the at least one bladder 50 is arranged inside the first massaging member 20, and in this way, the at least one pump 40 and the at least one bladder 50 are prevented from being exposed, reducing any damage thereto. In addition, the at least one extending pipeline 60 may be exposed out of or arranged inside the adjustment belt 30. In some embodiments, at least a portion of each of the at least one extending pipeline 60 is inserted into the adjustment belt 30, such that the at least one extending pipeline 60 is protected.

In the present disclosure, by arranging the at least one extending pipeline 60 as described in the above, the user, when using the massager 100, may change the distance between the massager body 10 and the first massaging member 20 by adjusting the length of the adjustment belt 30, the extending portion 606 of the at least one extending pipeline 60 can be extended and retracted adaptively, such that the massager is applicable to to-be-massaged body parts of various sizes of various users. Specifically, when a size of a to-be-massaged body part is larger, the adjustment belt is adjusted to be longer accordingly, and the extending portion 606 is extended. When the size of the to-be-massaged body part is applicable to a pre-defined size of the massager, the extending portion 606 is reset to an original state thereof. Since the extending portion 606 can be extended in length, the massager is allowed to be pre-defined for a larger wearing size, such that the massager is fit to a larger wearable size range. In addition, difficulty in arranging the at least one extending pipeline 60 inside the massager is reduced, a normal size of the massager is not expanded.

For the massager 100 in the above-described embodiment, the at least one pump 40 mounted on the massager body 10 is connected to the at least one bladder 50 mounted on the first massaging member 20 via the at least one extending pipeline 60 which is extendable in length. In this way, the at least one bladder 50 can be adjusted to move as the first massaging member 20 moves, such that the at least one bladder 50 can fit the to-be-massaged body part, and at the same time, connection between the at least one bladder 50 and the at least one pump 40 is maintained. In addition, for the massager 100 of the present disclosure, the massaging function of the first massaging member 20 can be achieved without arranging the at least one pump 40 in the first massaging member 20.

Further, the massager body 10 is arranged with a second massaging member 102, and a second bladder 104 is arranged in the second massaging member 102. The second bladder 104 is connected to the at least one pump 40. The massaging function of the second massaging member 102 is achieved by the at least one pump 10 and the second bladder 104 operating cooperatively. In the present embodiment, by arranging the first massaging member 20 and the second massaging member 102, a plurality of body parts can be massaged, such that a massaging effect of the massager 100 is improved. For example, when the massager 100 is the head massager, the first massaging member 20 is configured to massage a rear of the head, and the second massaging member 102 massages eyes, a peripheral region of the eyes, temples, a face or a forehead.

Figure 7:
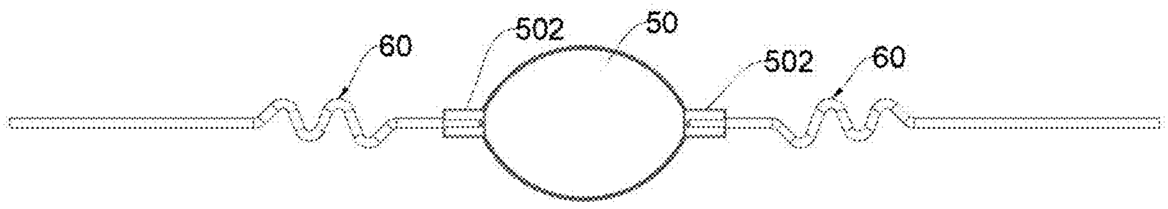
FIG. 7 is a structural schematic view of the bladder and two extending pipelines according to an embodiment of the present disclosure.
Figure 8:
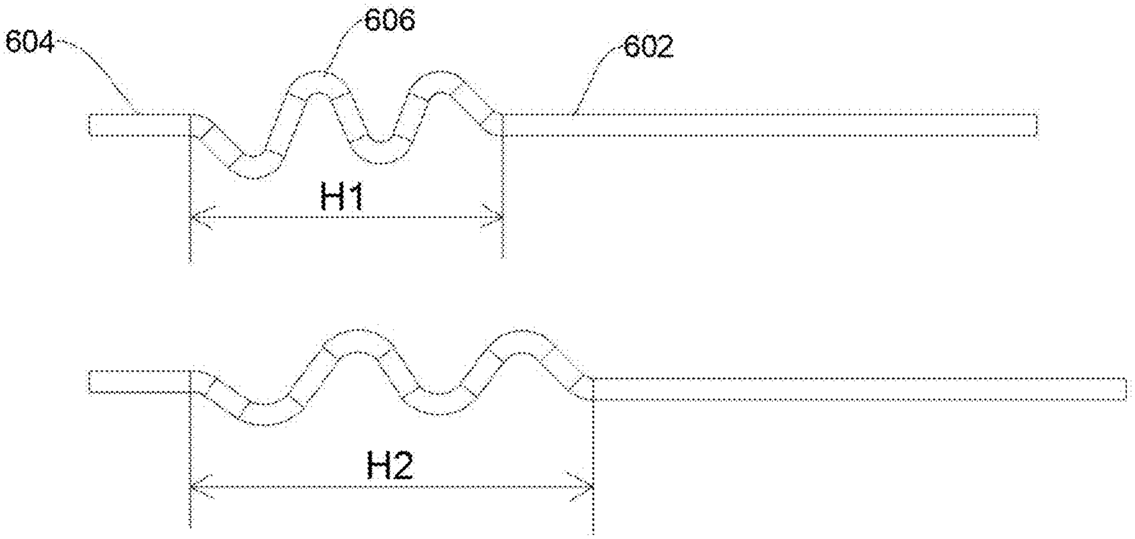
FIG. 8 is a structural schematic view of the extending pipelines according to an embodiment of the present disclosure, showing how an extending portion is extended.

As shown in FIGS. 7-8, the extending portion 606 is in one bending portion or a plurality of continuous bending portions. In some embodiments, the extending portion 606 is bent for a plurality of times in a plane or in a curved surface. For example, the extending portion 606 is bent for a plurality of times on a plane or a curved surface on which the adjustment belt 30 is located.

In an embodiment, the extending portion 606 includes a plurality of U shaped structures or V shaped structures sequentially connected to each other. In some embodiments, the extending portion 606 may be configured as a continuous Z shaped structure or a continuous M shaped structure. When the extending portion 606 is extended in length, bending angles of bending portions of the continuous plurality of V shaped structures are increased, such that the extending portion 606 is longer in length to be adapted to the adjustment belt 30 having an increased length. For example, as shown in FIG. 8, an initial length of the extending portion 606 is H1, a length of the extending portion 606 after being extended is H2, and H2 is greater than H1. In other words, a space enclosed by the massager body 10, the first massaging member 20, and the adjustment belt 20 changes as the extending portion 606 is extended and retracted.

Figure 9:
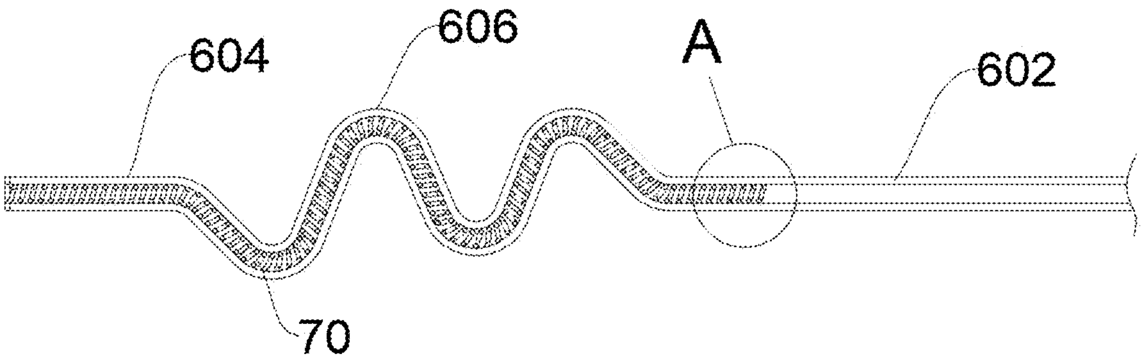
FIG. 9 is a structural schematic view of an interior of the extending pipeline, including an elastic member, according to an embodiment of the present disclosure.
Figure 10:
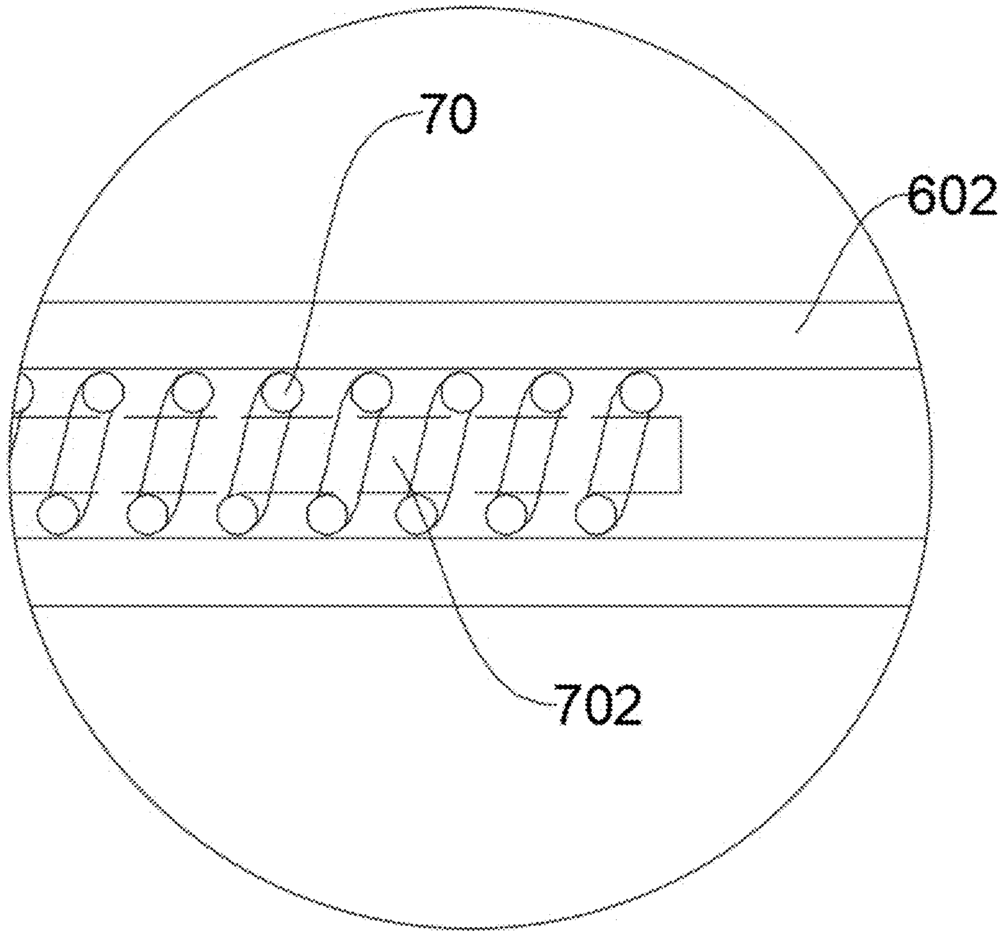
FIG. 10 is an enlarged view of a portion A shown in FIG. 9.

As shown in FIG. 9, the massager 100 further includes an elastic member 70. The elastic member 70 is arranged inside the extending portion 606 and is extending along a length direction of the extending portion 606. The elastic member 70 is also continuously bent for a plurality of times as the extending portion 606 is bent. The elastic member 70 can be extended in length synchronously as the extending portion 606 is extended. The elastic member 70 defines a connection cavity 702 extending along a length direction of the elastic member 70. The connection cavity 702 is configured to communicate the two connection portions 600 of the extending pipeline 60 with each other. In some embodiments, the elastic member 70 is a spring. The connection cavity 702 is formed by an inner space of the spring, as shown in FIG. 10. The spring is fixed to one or both of the two connection portions 600. That is, the spring may be fixed to either one of the two connection portions 600, or the spring may be fixed to both of the two connection portions 600. By arranging the spring, the extending portion 606 can be autonomously reset to its original state. Furthermore, due to a natural structure the spring, the spring has the connection cavity 702 at an interior of the spring, and the spring provides support to an inner wall of the extending portion 606. The extending portion 606 is prevented from being blocked at the bending portion, such that an ability of the extending portion 606 transmitting the fluid is not affected. Of course, the elastic member 70 may alternatively be other elements having capabilities of extending and retracting, which will not be limited herein.

In an embodiment, the extending pipeline 60 is a plastic tube. During producing the extending pipeline 60, the extending pipeline 60 can be directly molded as a one-piece structure having the extending portion 606. Of course, the extending portion 606 may alternatively be formed by hot pressing a portion of the extending pipeline 60 that needs to be bent for extension. When the massager 100 includes two extending pipelines 60, the two extending pipeline 60 has a same specification. Therefore, only one set of molds is needed to produce the two extending pipelines 60. Multiple sets of molds for producing different sizes of extending pipelines can be avoided, such that production costs may not be increased.

In an embodiment, each of the at least one pump 40 is an air pump, and each of the at least one bladder 50 is an air bag. The present disclosure does not limit specific structures of the air pump and the air bag. In some embodiments, the pump 40 may alternatively be a liquid pump or an air-liquid mixture pump. Correspondingly, the bladder 50 is configured to receive a liquid or an air-liquid mixture.

In regard to how to adjust the distance between the first massaging member 20 and the massager body 10, in an embodiment, the adjustment belt 30 is made to be a fabric belt, and an adjustment clasp 36 is arranged on the adjustment belt 30. The adjustment clasp 36 is configured to change the overall length of the adjustment belt 30.

In another embodiment, the adjustment belt 30 is a belt body that can be elastically extended and retracted, such as an elastic belt. Stretching the adjustment belt 30 changes the overall length of the adjustment belt 30.

Figure 3:
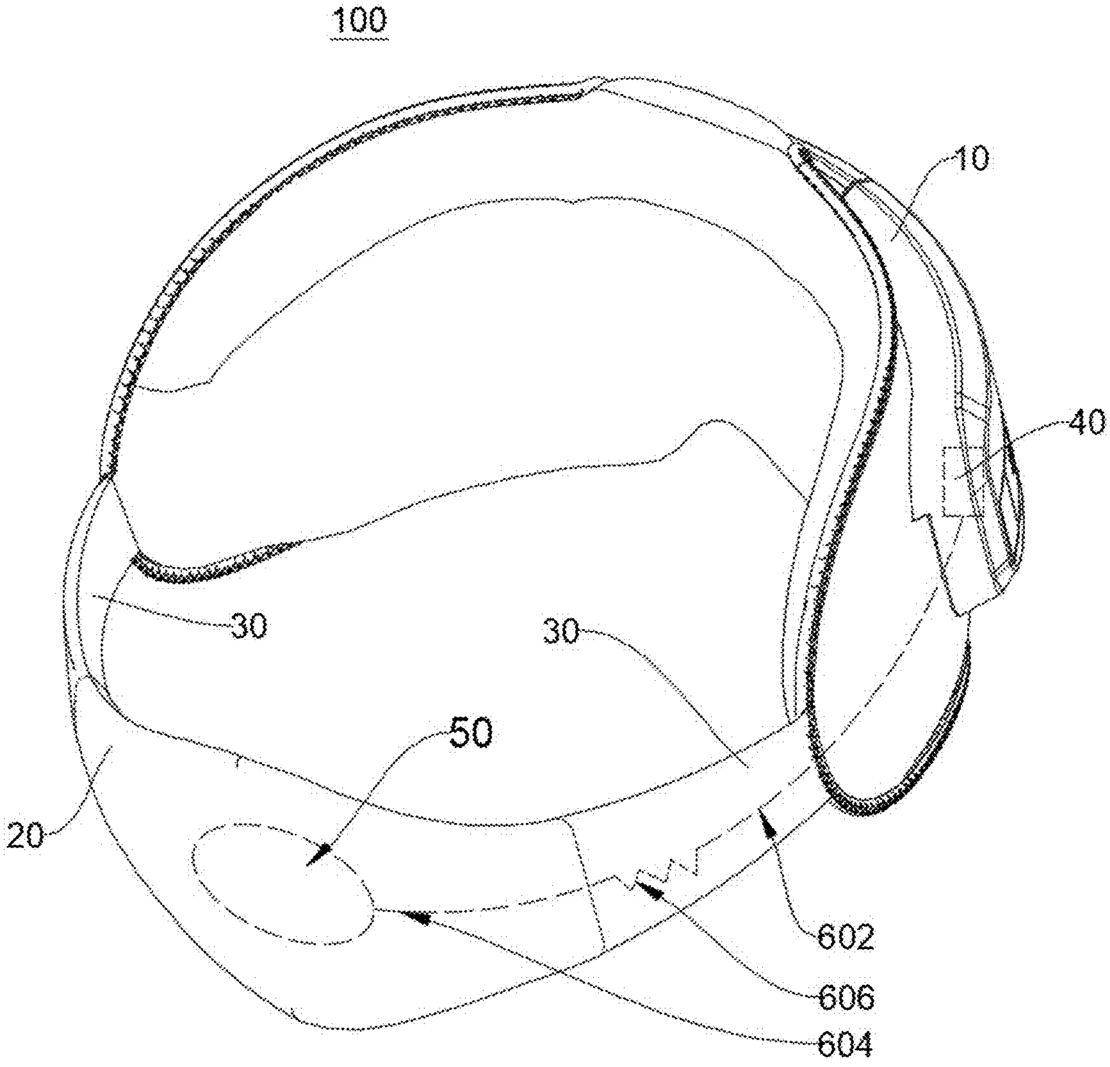
FIG. 3 is a structural schematic view of the entirety of the massager according to another embodiment of the present disclosure, where an adjustment belt and a first massaging portion are configured as a one-piece and integral structure.

In other embodiments, as shown in FIG. 3, the adjustment belt 30 and the first massaging member 20 may be configured as a one-piece and integral structure. In this way, both the adjustment belt 30 and the first massaging member 20 are made of an elastic material, and the distance between the first massaging member 20 and the massager body 10 can also be adjusted.

Figure 4:
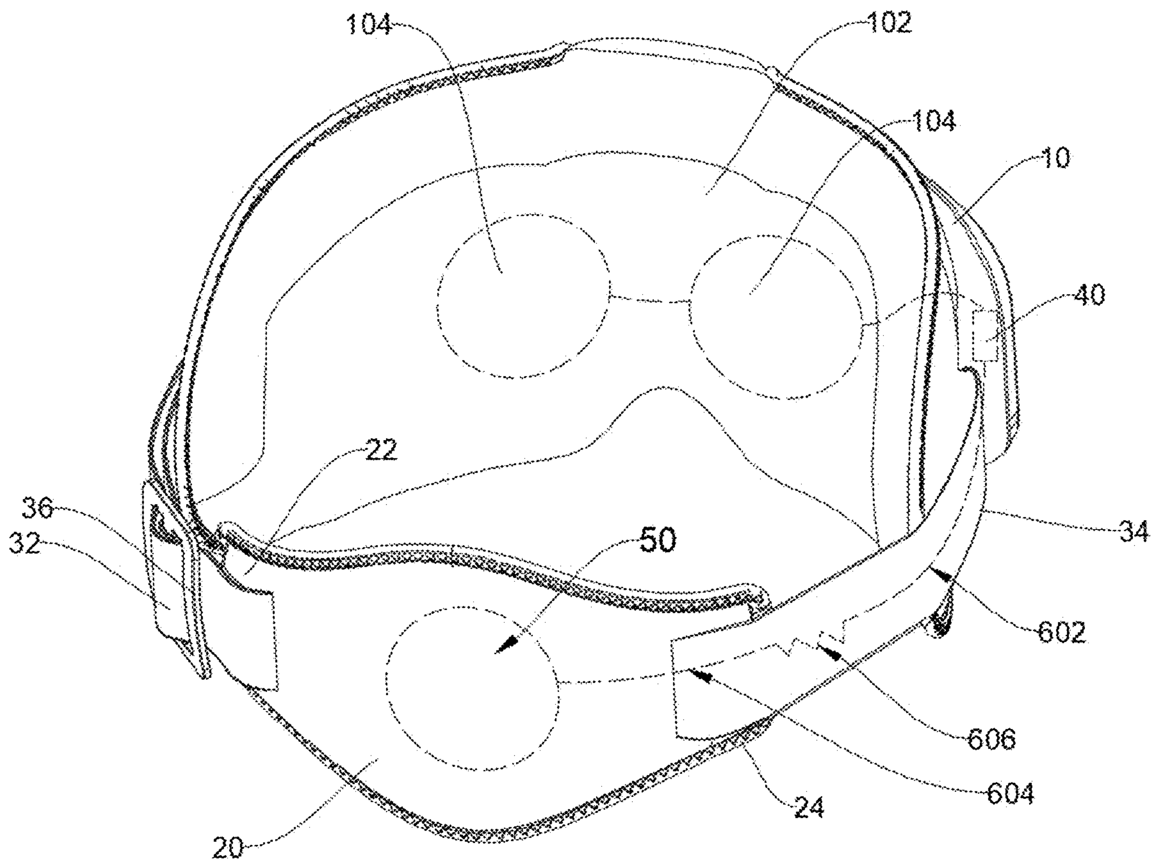
FIG. 4 is a structural schematic view of the entirety of the massager according to another embodiment of the present disclosure, where an adjustment clasp is arranged on the adjustment belt.

As shown in FIG. 4, in an embodiment, the adjustment belt 30 includes a first belt body 32 and a second belt body 34. The first massaging member 20 includes a first connection end 22 and a second connection end 24. The first belt body 32 connects the first connection end 22 to the massager body 10, and the second belt body 34 connects the second connection end 24 to the massager body 10. Each of the first belt body 32 and the second belt body 34 is a fabric belt body. The adjustment clasp 36 is arranged on the first belt body 32 and/or the second belt body 34 to adjust a length of the first belt body 32 and/or the second belt body 34. The number of the at least one extending pipeline is one, and the extending pipeline pass through one of the first belt body or the second belt body.

Figure 2:
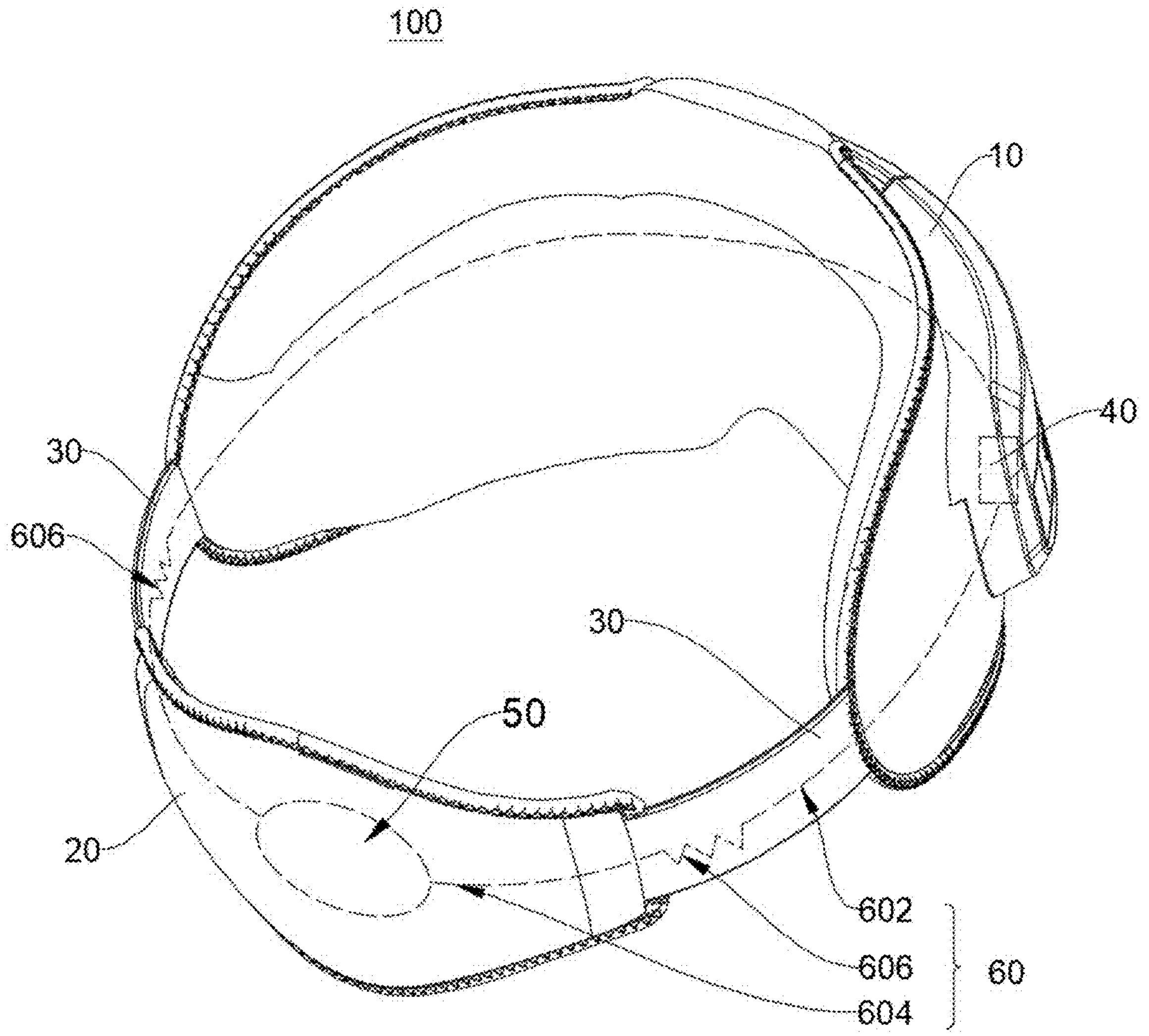
FIG. 2 is a structural schematic view of the entirety of the massager, showing two extending pipelines, according to another embodiment of the present disclosure.

In another embodiment, as shown in FIG. 2, each of the first belt body 32 and the second belt body 34 is a belt body that can be elastically extended and retracted, such as an elastic belt. The number of the at least one extending pipeline 60 is two. The extending portion 606 of one of the two extending pipelines 60 is inserted in the first belt body 32; and the extending portion 606 of the other one of the two extending pipelines 60 is inserted in the second belt body 34. In this case, the bladder has two opening ends 502 for filling and discharging fluid. The two extending pipelines 60 are respectively connected to the two opening ends 502 of the bladder 50, as shown in FIG. 7. The two extending pipelines 60 are connected to the pump 40. In this way, the pump 40 can simultaneously transfer the fluid to the bladder 50 through the two extending pipelines 60 to increase an expansion or retraction speed of the bladder 50, such that the massaging effect of the massager 100 is improved.

Figure 11:
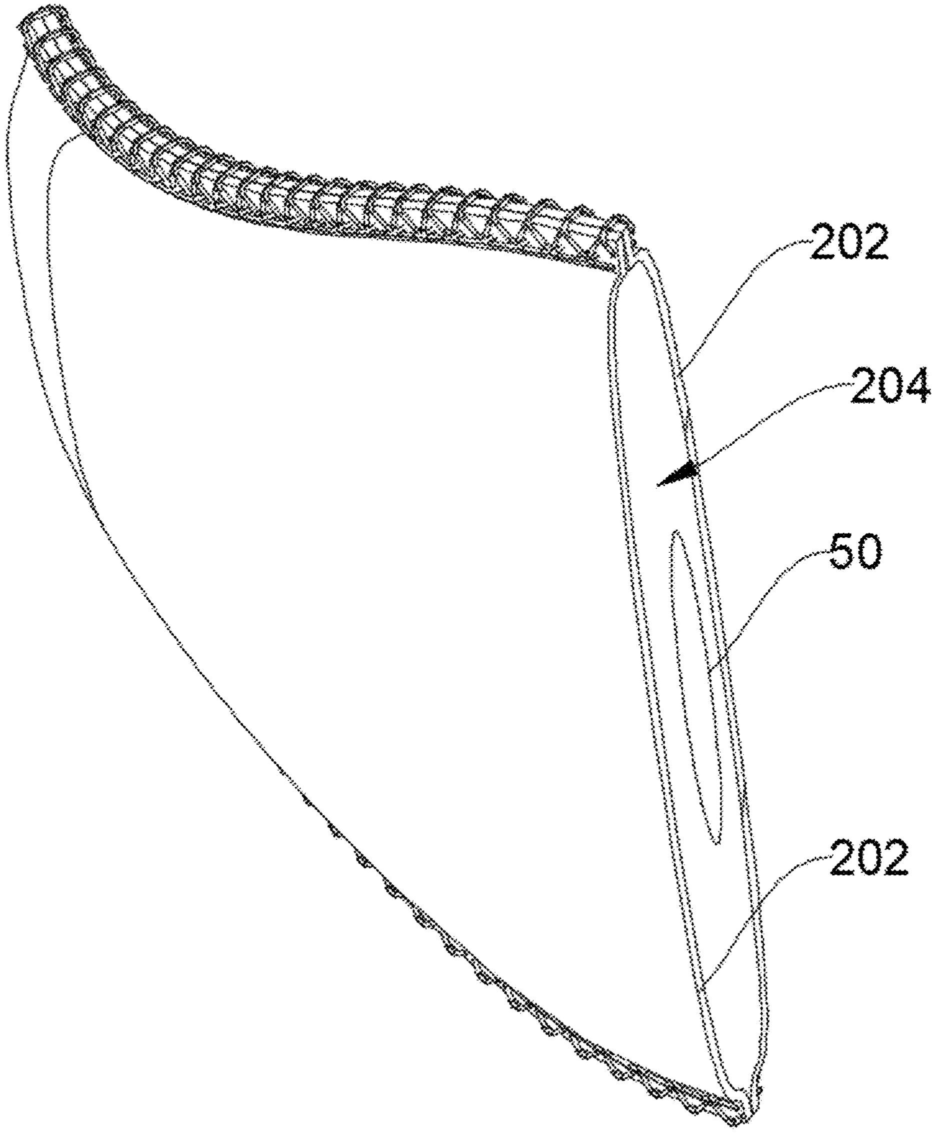
FIG. 11 a cross-sectional view of a first massaging member according to an embodiment of the present disclosure.

In an embodiment, as shown in FIG. 11, the first massaging member 20 includes two fabric layers 202. The two fabric layers 20 are connected to each other to form a receiving space 204. The bladder 60 is received in the receiving space 204. In addition, the receiving space 204 may be filled with soft materials, such as sponge, velvet, or the like.

To be noted that the massager 100 provided by the embodiments of the present disclosure can be configured to massage the head, the eyes, the chest, the waist, the buttocks, the hands, the palms, the elbows, the legs, the feet, the knees, and other body parts. That is, the embodiments of the present disclosure do not limit application scenarios of the massager 100.

The massager body 10 of the massager may be made of a rigid material or a soft material depending on the application scenario. For example, when the massager is configured as a waist massager, the massager body 10, the second massaging member 102, the first massaging member 20, and the adjustment belt 30 are all made of elastic belts and made into a one-piece structure for use. Each of the at least one bladder 50 and the second bladder 104 are evenly distributed in the waist massager. In another example, when the massager is configured as a head massager, the massager body 10 is configured with a hard shell, the second massaging member 102 and the first massaging member 20 are made of soft fabric, the adjustment belt 30 is the elastic belt and connects the first massaging member 20 to the second massaging member 102. The at least one pump 40 is arranged inside the hard massager body 10, the second bladder 104 is arranged inside the soft second massaging member 102, the at least one bladder 50 is arranged inside the soft first massaging member 20, and the at least one extending pipeline 60 is arranged inside the adjustment belt. Similarly, massagers for other body parts can be designed according to the application scenarios.

Obviously, the above-described embodiments show only a part of, not all of, the embodiments of the present disclosure. The accompanying drawings provide preferred embodiments of the present disclosure without limiting the scope of the present disclosure. The present disclosure may be achieved in various forms. These embodiments are provided for the purpose of understanding the present disclosure more thoroughly and comprehensively. Although the present disclosure has been described in detail with reference to the foregoing embodiments, any ordinary skilled person in the art may modify the technical solutions recorded in the foregoing specific embodiments or to make equivalent substitutions for some of the technical features therein. Any equivalent structure performed based on the contents of the specification and the accompanying drawings of the present disclosure, applied directly or indirectly in other related technical fields, shall all be equivalently included in the scope of the present disclosure.

What is claimed is:

1. A massager, comprising:

a massager body;

a first massaging member, wherein a distance between the first massaging member and the massager body is adjustable;

at least one pump, arranged on the massager body;

at least one bladder, arranged on the first massaging member and communicated with the at least one pump;

at least one extending pipeline, communicating one of the at least one pump with one of the at least one bladder, or communicating any two of the at least one bladder with each other; wherein each of the at least one extending pipeline comprises two connection portions and an extending portion connecting the two connection portions with each other; each of the two connection portions is connected to a respective one the at least of one pump or a respective of one the at least one bladder, and the extending portion is extendable in length;

an adjustment belt, wherein the first massaging member is connected to the massager body via the adjustment belt and the adjustment belt is adjustable in length to change the distance between the massager body and the first massaging member;

wherein the extending portion is inserted in the adjustment belt and is extendable in length along the adjustment belt; and wherein the adjustment belt is elastically extendable and retractable.

2. The massager according to claim 1, wherein a number of the at least one bladder is one; a number of the at least one extending pipeline is one; a number of the at least one pump is one; one of the two connection portions of the extending pipeline is connected to the pump, and the other one of the two connection portions is connected to the bladder.

3. The massager according to claim 1, wherein a number of the at least one bladder is at least two, a number of the at least one extending pipeline is at least two; the two connection portions of one of the at least two extending pipelines are respectively connected to two of the at least two bladders; the two connection portions of another one of the at least two extending pipelines are respectively connected to one of the at least one pump and the other one of the at least two bladders.

4. The massager according to claim 1, wherein the at least one pump is arranged inside the massager body, the at least one bladder is arranged inside the first massaging member; one of the two connection portions is inserted into the massager body to be connected to the at least one pump; and the other one of the two connection portions is inserted into the first massaging member to be connected to the at least one bladder.

5. The massager according to claim 1, wherein the extending portion has a plurality of bending portions.

6. The massager according to claim 5, wherein the extending portion is bent for a plurality of times on a plane or on a curved surface.

7. The massager according to claim 5, wherein the extending portion has a plurality of U shaped structures or a plurality of V shaped structures continuously connected to each other.

8. The massager according to claim 1, further comprising an elastic member, wherein the elastic member is disposed inside the extending portion and is extending along a length direction of the extending portion; the elastic member is capable of extended in length as the extending portion is extended; the elastic member defines a connection cavity extending along a length direction of the elastic member; and the connection cavity is communicated with the two connection portions.

9. The massager according to claim 8, wherein the elastic member is a spring; and the spring is fixed to one or both of the two connection portions.

10. The massager according to claim 1, wherein the at least one extending pipeline is a plastic pipeline, and the extending portion is formed by hot pressing.

11. The massager according to claim 1, wherein the adjustment belt is a fabric belt, the adjustment belt is arranged with an adjustment clasp and is configured to adjust a length of the adjustment belt.

12. The massager according to claim 1, wherein the adjustment belt further comprises a first belt body and a second belt body; the first massaging member further comprises a first connection end and a second connection end; the first belt body connects the first connection end to the massager body; and the second belt body connects the second connection end to the massager body.

13. The massager according to claim 12, wherein each of the first belt body and the second belt body is a fabric belt; an adjustment clasp is arranged on the first belt body and/or the second belt body and is configured to adjust a length of the first belt body and/or the second belt body.

14. The massager according to claim 12, wherein the first belt body and the second belt body are both elastically extendable and retractable; a number of the at least one extending pipeline is two; the two extending pipelines are respectively inserted into the first belt body and the second belt body.

15. The massager according to claim 4, wherein the first massaging member comprises two fabric layers; the two fabric layers are connected to each other to form a receiving space; the at least one bladder is received in the receiving space; one of the two connection portions is inserted into the receiving space to be connected to the at least one bladder.

16. The massager according to claim 1, wherein a number of the at least one bladder is one, a number of the at least one pump is one, and a number of the at least one extending pipeline is two; the bladder has two opening ends, respectively communicated with the two extending pipelines to be communicated with the pump.

17. The massager according to claim 1, wherein the at least one pump is an air pump, and the at least one bladder is an air bag; or the at least one pump is an air-liquid mixture pump, and the at least one bladder is configured to receive a liquid or an air-liquid mixture.

* * * * *